(12) United States Patent
Coffin

(10) Patent No.: US 8,947,670 B2
(45) Date of Patent: Feb. 3, 2015

(54) FLEXURE MOUNTED MOVING MIRROR TO REDUCE VIBRATION NOISE

(75) Inventor: John Magie Coffin, Blue Mounds, WI (US)

(73) Assignee: Thermo Electron Scientific Instruments Inc., Madison, WI (US)

(*) Notice: Subject to any disclaimer, the term of this patent is extended or adjusted under 35 U.S.C. 154(b) by 84 days.

(21) Appl. No.: 12/962,393

(22) Filed: Dec. 7, 2010

(65) Prior Publication Data

US 2012/0120404 A1   May 17, 2012

Related U.S. Application Data

(63) Continuation-in-part of application No. 12/944,512, filed on Nov. 11, 2010, and a continuation-in-part of application No. 12/944,428, filed on Nov. 11, 2010.

(51) Int. Cl.
| | |
|---|---|
| *G01J 3/45* | (2006.01) |
| *G01B 11/02* | (2006.01) |
| *G01J 9/02* | (2006.01) |
| *G01J 3/453* | (2006.01) |
| *G02B 26/10* | (2006.01) |

(52) U.S. Cl.
CPC .............. *G01J 3/4535* (2013.01); *G01J 9/02* (2013.01); *G02B 26/101* (2013.01)
USPC ............ 356/452; 356/451; 356/508; 356/510

(58) Field of Classification Search
USPC .................. 356/451, 452, 508, 510; 248/466, 248/475.1–488; 359/202.1, 224.1, 904
See application file for complete search history.

(56) References Cited

U.S. PATENT DOCUMENTS

| | | | | |
|---|---|---|---|---|
| 4,480,914 A | * | 11/1984 | Thompson et al. | 356/452 |
| 5,486,917 A | * | 1/1996 | Carangelo et al. | 356/452 |
| 5,776,256 A | | 7/1998 | Born et al. | |
| 5,801,833 A | * | 9/1998 | Kobayashi et al. | 356/487 |
| 5,883,712 A | | 3/1999 | Coffin | |
| 5,949,544 A | * | 9/1999 | Manning | 356/452 |

(Continued)

FOREIGN PATENT DOCUMENTS

| | | |
|---|---|---|
| CN | 2679643 Y | 2/2005 |
| CN | 1737492 A | 2/2006 |

OTHER PUBLICATIONS

First Office Action issued in Chinese Application No. 201180054257.X, Aug. 28, 2014.

*Primary Examiner* — Tarifur Chowdhury
*Assistant Examiner* — Hina F Ayub
(74) *Attorney, Agent, or Firm* — Ion C. Abraham

(57) ABSTRACT

A novel means of provided a hybrid flexure mounted moving mirror component in an interferometer is introduced herein. In particular, a linear bearing in combination with a novel flexure mounting having novel tilt and velocity control of the moving optical component is provided. Such an arrangement enables correction of the errors at the mirror itself while also solving the problem of isolating vibration and noise caused by the imperfections in the bearing surfaces used in many conventional interferometers. Using such a coupled flexure mounting of the present invention, in addition to the above benefits, also enhances velocity control because the resultant low mass of the moving mirror assembly enables the systems disclosed herein to respond faster than conventional mirror velocity controlled interferometer instruments and with a lower velocity error so as to provide a more stable and lower noise spectra from the analytical instrument.

10 Claims, 3 Drawing Sheets

(56) References Cited

U.S. PATENT DOCUMENTS

| | | |
|---|---|---|
| 7,374,300 B2 | 5/2008 | Mehrtens et al. |
| 7,388,700 B1 * | 6/2008 | Odhner ................... 359/224.1 |
| 7,710,574 B2 * | 5/2010 | Sin et al. .................... 356/452 |
| 8,169,616 B2 * | 5/2012 | Johnson et al. ............. 356/452 |
| 2002/0149777 A1 * | 10/2002 | Schreiber ................... 356/452 |
| 2006/0066875 A1 * | 3/2006 | Huber et al. ................ 356/519 |
| 2008/0013097 A1 * | 1/2008 | del Puerto .................. 356/500 |
| 2008/0291426 A1 * | 11/2008 | Azimi et al. .................. 356/51 |
| 2009/0185133 A1 * | 7/2009 | Sakakibara .................. 351/211 |
| 2009/0236525 A1 * | 9/2009 | Mitra et al. ................ 250/338.4 |
| 2009/0290167 A1 * | 11/2009 | Flanders et al. ............. 356/497 |

\* cited by examiner

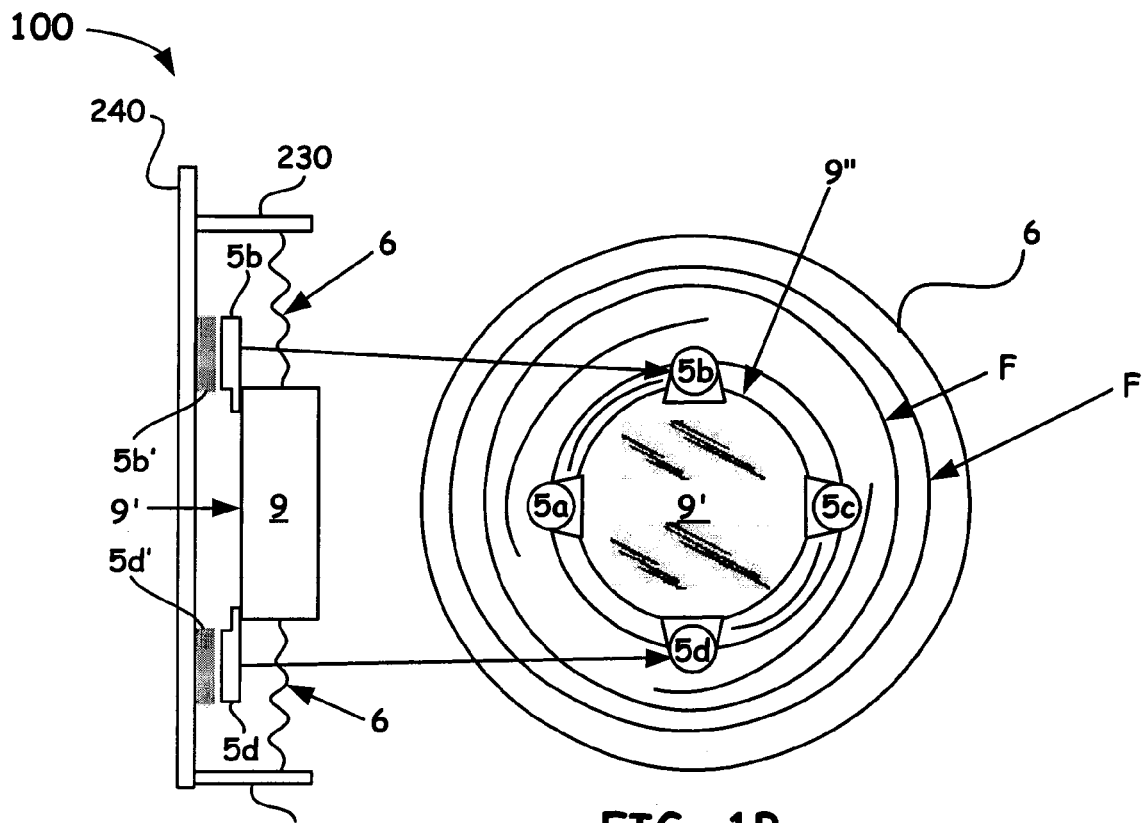
FIG. 1A
FIG. 1B
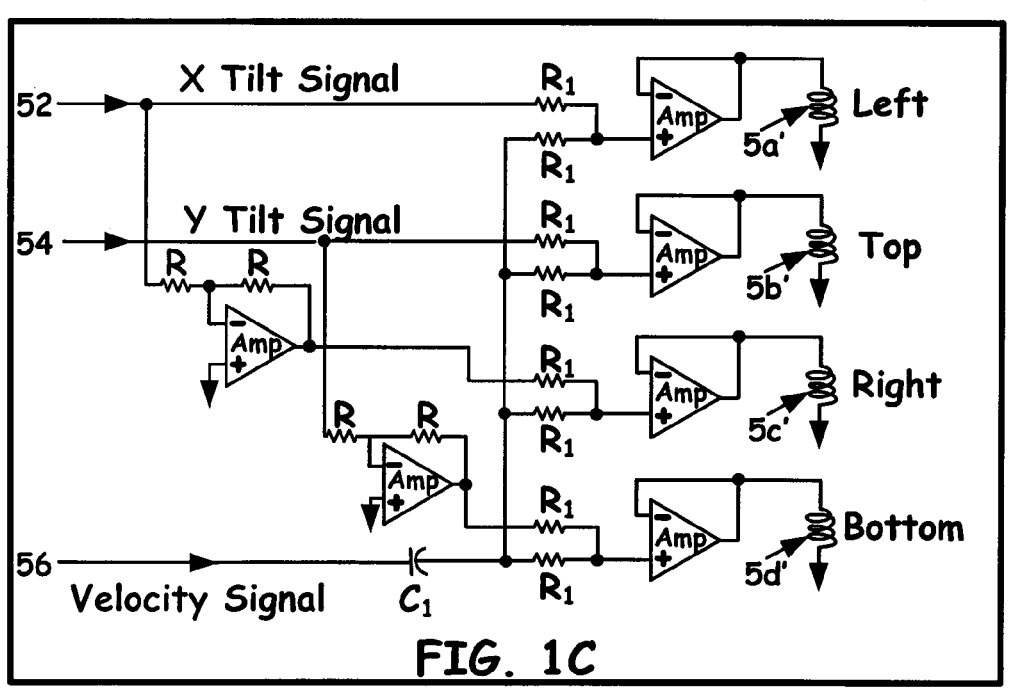
FIG. 1C

FLEXURE MOUNTED MOVING MIRROR TO REDUCE VIBRATION NOISE

RELATED APPLICATIONS

This application is a Continuation-in-Part of U.S. patent application Ser. No. 12/944,512 entitled: "INTERFEROMETER VELOCITY CONTROL OF BEAMSPLITTER AND MOVING MIRRORS," filed Nov. 11, 2010, and of U.S. patent application Ser. No. 12/944,428, entitled: "DUAL INPUT INTERFEROMETER BEAMSPLITTER TILT CONTROL SYSTEM AND FLEXURE MOUNTING," also filed on Nov. 11, 2010, both of which are incorporated by reference in its entirety.

BACKGROUND OF THE INVENTION

1. Field of the Invention

The present invention relates to the field of optical scientific instrumentation. More specifically, the present invention relates to a novel flexure coupled moving mirror utilized in a Fourier-Transform infrared (FTIR) interferometer.

2. Discussion of the Related Art

An optical interferometer used in a scientific analytical instrument relies on the interference of superimposed optical beams as part of the interrogation means. When configured as a Michelson Fourier-Transformed infrared (FTIR) instrument, the optical output of the interferometer is called an interferogram. The FTIR interferometer itself often includes a beamsplitter and two mirrors, one that is conventionally stationary, and one which is conventionally mobile. The mobile mirror moves along the optic axis while staying optically perpendicular to the light beam at all times. The movement of the mobile mirror is often desired to be feedback controlled in order to hold the mirror velocity constant (while also controlling tilt) so that the analytical radiation that passes through the interferometer produces an accurate interferogram. Conventional interferometers have a moving mirror assembly that includes a linear ball bearing, air bearing, slide bearing, or a flexure bearing and is often driven by a linear motor (e.g., a coil coupled to a permanent magnet) to provide velocity control.

Because of the delicate nature of such instruments, conventional systems are often configured to be precisely aligned with mechanical adjustments that must stay correctly adjusted even if the system is shipped around the world. This has resulted in expensive stiff precision mechanical interferometer systems that sometimes need adjustments in the field after shipping shocks has shifted the alignment of the critical flat optical surfaces. In operation, many of such conventional systems use active control systems (i.e., dynamic alignment) to control mirror tilt as the interferometer scans and collects a desired spectral data. Such systems can only operate if the interferometer is scanning under the control of a laser based velocity control servo that all typical scanning interferometers use.

However, it is to be noted that while all practical interferometers use one or more laser based velocity measuring systems to enable a servo control system to control the velocity of the moving mirror, such servos can only correct velocity errors after a small time delay (caused by the velocity measurement process and the delay in generating correcting forces). Therefore velocity errors that occur slowly are corrected and largely eliminated. However velocity errors that occur at a rapidly changing rate due to induced noise cannot be corrected completely leaving a remaining velocity error that negatively affects the spectra data collected. In addition, many interferometers use a laser phase tilt error measuring system to control tilt in both X and Y axis, which in addition to the velocity control servo, also needs to be monitored to correct undesired tilt errors via induced noise, which can additionally affect a given spectra.

Background information on such an interferometer system that utilizes dynamic control of the moving mirror, is described and claimed in, U.S. Pat. No. 5,883,712, entitled, "INTERFEROMETER OF AN INFRARED SPECTROMETER WITH DYNAMIC MOVING MIRROR ALIGNMENT" issued Mar. 16, 1999, to John M. Coffin, including the following, "[i]n accordance with the present invention, an interferometer for an infrared spectrometer provides dynamic alignment of the moving mirror to maintain precise alignment between the moving mirror and the fixed mirror. The alignment of the moving mirror in this manner maximizes the stability of the interferometer while achieving high levels of output accuracy despite vibrations due to the movement of the moving mirror on its bearings and vibrations transmitted from external sources to the interferometer. The dynamics of the mounting of the moving mirror allow the position of the mirror to be controlled with high accuracy even in the presence of relatively high frequency vibrations. The structure of the interferometer and of the detectors and controls for maintaining the alignment of the moving mirror are nonetheless simple in construction and contribute relatively little additional bulk or weight to the interferometer."

Accordingly, a need exists for an improved inexpensive moving mirror assembly so as to correct tilt and velocity errors at the moving mirror component in addition to simultaneously isolating vibration and noise caused by the imperfections in the bearing surfaces of all rolling and sliding bearings used in interferometers.

SUMMARY OF THE INVENTION

The present invention is directed to a novel hybrid moving mirror assembly that includes: a reflector; a resilient member coupled about the periphery of the reflector and further coupled to a support structure; wherein the resilient member minimizes induced external stresses directed through the support structure and wherein the resilient member is configured to provide a retarding force when flexed. The assembly also includes a first plurality of movement means coupled to a predetermined surface of the reflector; a second plurality of movement means configured to couple matched and/or mismatched predetermined forces with the first movement means, wherein the matched and/or mismatched predetermined forces enables short stroke linear movement and/or X, Y tilting movements of the reflector; and a linear movement means coupled to the support structure to provide long stroke velocity and position control of the resiliently mounted reflector.

Another aspect of the present invention is directed to a dynamic hybrid moving mirror interferometer that includes: a beam splitter for receiving a beam of radiation from a source so as to provide a first and a second portioned beam; a reflector configured to receive and return the first portioned beam of the source along a first optical path length; a resiliently mounted reflector coupled to a support structure, wherein the resiliently mounted reflector is configured to receive and return the second portioned beam of the source along a second optical path length; a first movement means coupled to a predetermined surface of the resiliently mounted reflector to provide a short stroke velocity and position control and/or a tilt control about configured X and Y axes of the resiliently mounted reflector; a second movement means coupled to the support structure to provide a long stroke velocity and position control of the resiliently mounted reflector; and a control means for providing a controlled feedback to the first and second movement means to enable the short stroke velocity and position control and/or a combined tilt control about the configured X and Y axes in addition to the long stroke velocity and position control so as to provide an interrogating interferogram of the input source beam radiation at a configured exit of the interferometer.

Accordingly, the present invention provides for a beneficial hybrid combination of a long stroke bearing system and a coupled short stroke resilient bearing mirror arrangement within an interferometer instrument. Such an arrangement enables correction of the errors at the mirror itself while also solving the problem of isolating vibration and noise caused by the imperfections in the bearing surfaces used in many conventional interferometers. Using such a coupled flexure mounting of the present invention, in addition to the above benefits, also enhances velocity control because the resultant low mass of the moving mirror assembly enables the systems disclosed herein to respond faster than conventional mirror velocity controlled interferometer instruments so as to provide for more stable and lower noise spectral data.

BRIEF DESCRIPTION OF THE DRAWINGS

FIG. 1A shows a side view perspective of a beneficial flexure mounted moving mirror configuration of the present invention.

FIG. 1B shows a back view of the flexure mounted moving mirror portion illustrated in FIG. 1A.

FIG. 1C shows an example resistor matrix and coupled operational amplifiers circuit that can be used to provide the desired velocity and/or tilt movements for the moving mirror configurations of the present invention.

DETAILED DESCRIPTION

Figure 2:
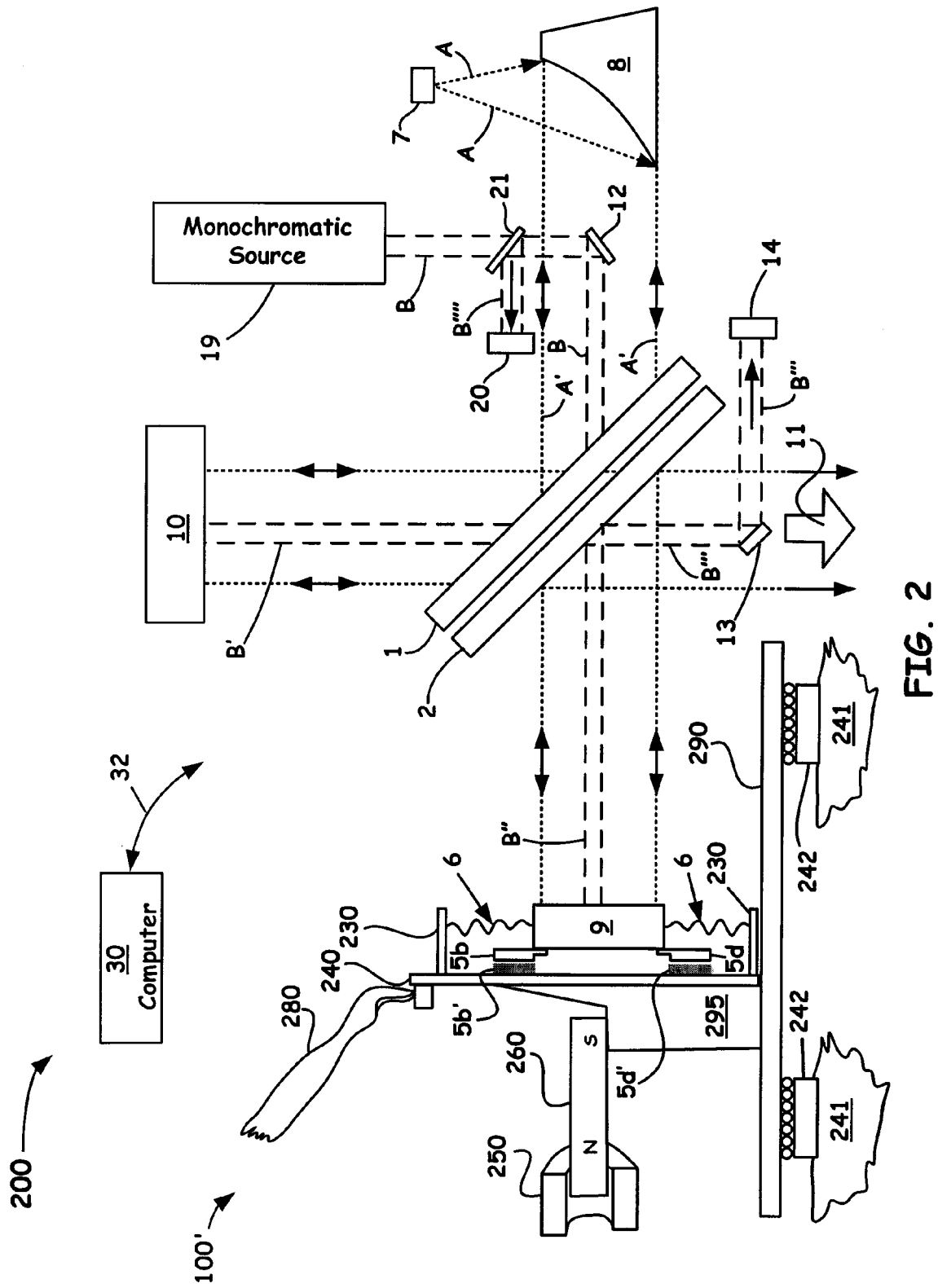
FIG. 2 illustrates a beneficial Hybrid Flexure Mounted Moving Mirror Interferometer System.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

The Hybrid Flexure (e.g., resilient member) Mounted Moving Mirror interferometer of the present invention is directed to solving the problem of vibration and noise created by the imperfections in the bearing surfaces of all rolling and sliding bearings used in interferometers. Such bearing noises cause mechanical jitter (variations in the speed) of the moving mirrors that are commonly used in interferometers in spectrophotometers. The design as presented herein, isolates vibration noise from the moving mirror, which improves the quality of the spectra output of the interferometer, thus allowing the use of even commonly available rolling and sliding bearings that are reliable and low in cost.

Interferometers that are used in spectrometers need to scan a moving mirror at a very stable velocity and without tilt to product high quality spectra. Also high resolution spectra require moving mirror stroke lengths of more than 1 cm in length. Flexure bearing provide the low noise operation needed as they have no rolling or sliding parts, however flexure bearings (unless they are very large and expensive) cannot provide stroke lengths of more than 0.5 cm. Sliding and rolling bearing can provide long strokes but have the undesirable noise caused by the imperfections in the smooth surfaces used in their operation.

The hybrid configuration of the present invention supports the moving mirror of an interferometer using both a flexure arrangement for isolation and short strokes and a desired bearing mechanism to provide very long stroke lengths as needed for high resolution measurements. Accordingly, the resilient members described herein is disposed in the system (e.g., between the noisy long stroke bearing and the moving mirror) so as to prevent the high frequency vibrations of the long stroke bearing from coupling into the moving mirror.

As stated previously, all practical interferometers use a laser based velocity measuring system that allows a servo control system to control the velocity of the moving mirror. Such servos can correct velocity errors after a small time delay (e.g., as caused by the velocity measurement process and the delay in generating correcting forces). Therefore velocity errors that occur slowly are corrected and largely eliminated. However velocity errors that occur at a rapidly changing rate cannot be corrected completely leaving a remaining velocity error that negatively affects the spectra data collected.

The design of the present invention can correct such errors by the use of a low cost small short stroke (+/−1 mm) resilient (e.g., flexure) bearing to isolate the vibrations of the long stroke bearing from the important part of the moving mirror assembly. This hybrid combination of a low cost flexure and a separate long stroke linear bearing gives a low cost high quality interferometer moving mirror drive system.

Many interferometers also use a laser phase tilt error measuring system to control tilt in both X and Y axis in addition to the velocity control servo. The present invention can use the same flexure to provide the movement needed for both tilt control and velocity noise isolation at no increase in cost (other than the cost of the measurement and control electronics).

It is to be appreciated that since the interferometer tilt errors are typically caused by errors in the long stroke bearing system, correcting the errors at the resiliently configured moving mirror corrects the tilt errors before they affect the operation of the interferometer, allowing the lower cost long stroke bearing systems to be used so as to maintain the highest overall system performance.

Specific Description
Soft Flexure Moving Mirror Mount Assembly

Turning now to the figures, FIG. 1A shows a side view of a the beneficial Flexure Mounted Moving Mirror configuration, generally referenced by the numeral 100, which is utilized in the disclosed system embodiments of the present invention. In particular with respect to FIG. 1A, the moving optical component 9 (e.g., a reflector) of the present invention is shown having a coupled resilient member 6 affixed to a support mounting structure 230. The optical component 9 (hereinafter mirror 9) can be configured as any reflector design known to those skilled in the art that can comport with the design specifications of the embodiments herein. Example mirror designs include, but are not limited to, corner-cube mirrors, metal reflectors, and substrate materials (e.g., potassium bromide (KBr)) coated with high-reflectivity metal or dielectric high-reflectivity and/or protective films.

The back surface 9' (as denoted by the accompanying directional arrow) of mirror 9 is also shown coupled to one or more magnetic drive and tilt movement means 5b and 5d (only two shown because of the perspective view) that is part of the assembly 100. FIG. 1A also generally shows a circuit board 240 that is configured to provide correctional signals directed to respective drive coils (e.g., reference characters 5b' and 5d'). Upon receiving such one or more correctional signals, the drive coils, e.g., 5b' and 5d', provide for desired magnetic forces that in cooperation with the magnetic movement means (e.g., permanent magnets 5b and 5d) enable for precision individual movement of the mirror 9, as to be detailed herein.

FIG. 1B shows a back view perspective of the mirror 9 portion shown in FIG. 1A. Specifically, FIG. 1B illustrates the beneficial arrangement of having the resilient member 6 (e.g., a diaphragm flexure) being coupled about the periphery of mirror 9. FIG. 1B also now shows a greater plurality of velocity drive and tilt means (e.g., the coupled magnets, as denoted by the reference characters 5a, 5b, 5c, and 5d).

It is to be appreciated that the resilient diaphragm-like flexure configuration 6, as better illustrated in FIG. 1B, is often but not necessarily constructed with thicknesses of up to about 0.5 mm and from beneficial materials, such as, but not limited to, polymers, plastics, Mylar, metals, paper, etc. As a beneficial embodiment, the diaphragm-like flexure 6 can be configured from low cost fabric, such as, but not limited to Kevlar, as commonly found in loudspeakers. In addition, such resultant resilient diaphragm flexures 6 can be permeated (e.g., with varnish) or treated with materials to also further tailor the stiffness and thus the resultant desired movements of moving mirror 9. If needed, the resilient diaphragm-like flexures 6 can also be designed with several folding lines, e.g., corrugations, (denoted by the letter F, as shown in FIG. 1B), to reinforce the resultant flexure while also providing the desired rigidity/resiliency and thus controlled deformations in all directions so as to aid in movement of the mirror 9 while still fully protecting the optical flatness of the held substrate.

Such a resultant structure can thus beneficially deform and bend up to about a travel distance of about +/−4 mm without damage but is more beneficially configured to travel distances of about 2 mm in one direction and still have sufficient elasticity to spring back to the original position after shocks have been experienced. It is important to note that if the center of mass and the center of rotation of a mirror mount are not matched, then as the force of gravity changes as the interferometer is moved to a different orientation or the interferometer experiences acceleration forces caused by floor shake and vibration, the offset in the center of mass and center of rotation can generate torque(s) that result in undesired tilt of the held mirror 9. Such an unwanted tilt must then be corrected to get the best performance. Accordingly, the pivot point of the resilient members 6 of the present invention is beneficially designed to be coupled to mirror 9 at a position, for example, substantially at the same position as the center of mass of mirror 9 (as generally shown in FIG. 1B) so as to eliminate or minimize outside vibration from tilting the mirror 9 mounted in a fashion described herein.

It is to be appreciated that such resilient (flexure) types of bearings have been found in utilization with the present configurations to have low velocity error or noise because the bending action of the flexures is very smooth due to the fact there is no sliding or rolling bearing action. This is important because no practical surface is truly smooth; therefore rolling and sliding bearings (which are also utilized in the present invention) in contradistinction to the flexure bearing configurations of the present invention, always add velocity error noise as the non smooth parts slide or roll past each other.

Accordingly, coupling the moving mirror 9, as shown in FIG. 1A, to the resilient member 6 about its periphery (as described below) after engaging moving mirror 9 through a central opening 9" (as shown generally by the directional arrow in FIG. 1B) enables not only linear and or retarding force movement of mirror 9 but also tilting movement (i.e., because of the flexure capability) when induced by applied magnetic forces to magnetic movement means 5a, 5b, 5c, and 5d.

To affix mirror 9 within the central opening of resilient flexure member 6, the moving mirror 9 is often, but not necessarily, fixidly attached in place with adhesive material (e.g., via gluing). Beneficially, the effective amount of adhesive material is thinner than the substrate and thus geometrically weaker. Because the adhesive is geometrically weaker, the stresses that can build up due to temperature changes and as it cures, cannot warp the thicker and stronger substrate.

It is also to be noted that the flexure resilient member 6, as shown in FIGS. 1A and 1B, is by design weaker and less stiff than a utilized optical substrate configured to be disposed therein. Such a flexible arrangement beneficially holds mirror 9 and yet allows movement as the external mounting support member, e.g., 230, experiences, for example, shock while the instrument is in, for example transit or receiving any induced vibrations. The thin flexible resilient member 6 thus limits the stress levels in the optical mirror 9 material because the mounting configuration is, as stated above, weaker than the substrate material itself. In addition, with respect to the use of adhesive coupling material, if there is stress which occurs because of temperature changes or additive adhesive shrinkage, the weaker and less stiff resilient member 6, deforms, still leaving the optical materials (e.g., if a planar optical substrate is used) flat.

The 1999 patent referenced above describes a velocity and tilt controlled mirror that used a single magnet that is controlled in velocity by a single coil of wire around the magnet and two pairs of coils outside the first coil to provide a sideways force in X and Y to the same magnet causing the mirror to tilt providing all axis of control of the moving mirror by using only one magnet. This approach also works in the present invention but the four coil design is easier to design and gives more force for lower response times.

The velocity of the moving mirror 9 can be controlled by using the same one or more movement means, e.g., predetermined sized magnets 5a, 5b, 5c, and 5d, and coils (e.g., 5a', 5b', 5c', and 5d', as shown in FIG. 1C) that are used to also control the tilt of the optical element. Coupling of the magnets 5a, 5b, 5c, and 5d to the moving mirror 9 can be by any means known to those skilled in the art, such as, for example, an epoxy-like adhesive. Since the magnets 5a, 5b, 5c, and 5d are light (less than 10 grams) and small, the attachment areas to the mirror 9 are also correspondingly small so that any adhesive shrinkage only affects an unimportant area at the edge of the mirror 9, thus allowing a small yet simple magnet attachment system, as generally shown in FIGS. 1A and 1B. Moreover because the magnets do not come into contact with anything else in the system, they additionally cannot transmit external shock and stress to the coupled mirror 9.

The velocity of the mirror 9 is thus provided by driving the same coils (e.g., 5a', 5b', 5c', and 5d', as shown in FIG. 1C) coupled to the magnets 5a, 5b, 5c, and 5d, as shown in FIG. 1B, all at the same time with substantially the same velocity control signal 56. In this operation, the substantially matched coupled magnets 5a, 5b, 5c, and 5d receive induced magnetic forces that can move the coupled mirror 9 in a linear fashion. In particular, feedback optical signals (described later) are monitored by a configured velocity control unit (not shown) to provide the appropriate low power level signal(s) 56 that are increased (amplified) by the servo circuit shown in FIG. 1C so as to induce the magnetic fields that actually result in movement of mirror 9.

To provide tilt of the mirror 9, on the other hand, the one or more coils (5a', 5b', 5c', and 5d', as shown in FIG. 1C) that couple magnetic fields to the corresponding one or more magnets, e.g., magnets 5a, 5b, 5c, and 5d, are independently driven by predetermined induced matched and/or mismatched magnetic forces to any of the one or more magnets 5a, 5b, 5c, and 5d.

Specifically, tilt can be provided by the one or more coils (5a', 5b', 5c', and 5d', as shown in example circuit FIG. 1C) by independently directing predetermined induced mismatched and/or matched magnetic forces of often less than about 0.5 Teslas to any of the one or more magnets 5a, 5b, 5c, and 5d (Note that the use of the resilient member 6 beneficially allows such tilting movements). In cooperation with such directed mismatched and/or matched magnetic forces, feedback optical signals are monitored by one or more configured example tilt control systems, as discussed below in detail with respect to FIG. 3, to provide the appropriate low power signals 52 and 54 shown in FIG. 1C and FIG. 3 that are increased or amplified so as to induce the magnetic fields that actually result in tilt movements of mirror 9.

FIG. 1C thus shows a beneficial example resistor (denoted as $R_1$) matrix and coupled operational amplifier (denoted as Amp with corresponding resistors R) servo circuit that can be used to provide the desired velocity and/or tilt movements of mirror 9. In this example configuration that illustrates a basic operation, only four coils 5a', 5b', 5c', and 5d', as shown in FIG. 1C, and four corresponding magnets 5a, 5b, 5c, and 5d, as shown in FIG. 1B, are needed. While the simplistic design of FIG. 1C in combination with the configurations of FIG. 1A and FIG. 1B is beneficial, it is to be understood that the schematic illustrations are intended to be merely exemplary of one of many other designs which are possible.

As another arrangement for FIG. 1C, a capacitor $C_1$ (i.e., a high pass filter) can be added to limit mirror 9 travel. Specifically, adding $C_1$ in series with the velocity control signal 56, as shown in FIG. 1C insures that the DC portion of the velocity control signal does not reach moving mirror 9. The capacitor thus acts like a stiffer flexure as its capacitance is reduced. The added capacitor can be configured to limit mirror 9 movement to shorter distances while allowing the use of moving mirror 9 bearings that have more friction, i.e., (ceramic or glass) slide or slider type of linear bearings, to provide as much stroke length as is needed. Such a linear bearing can be configured to support the entire moving mirror assembly 100 including the flexure moving mirror 9 mount and the magnets and coils that are used to control the small movements of the moving mirror flexure 6. The small movements of the moving mirror 9, as allowed by the moving mirror flexure 6, can thus easily correct the position errors caused by a coupled long stroke linear ball or sliding bearing (the hybrid movement combination to be discussed with respect to FIG. 2) that supports the moving mirror 9 assembly 100.

Accordingly, the circuit of FIG. 1C in combination with the overall design of the system that includes the arrangement of the moving mirror 9 of the present invention, can provide a desired tilt of up to thousands of arc seconds (e.g., up to about 10,000 arc seconds) and a linear movement at up to about +/−1 millimeter. It is also to be appreciated that because of the design of mirror 9 configuration (i.e., as coupled to the example flexure 6 shown in FIGS. 1A and 1B), the overall mass of the assembly is reduced. The result is that only substantially low forces need be applied to move the mirror 9 and this aspect allows the use of the aforementioned small magnets (e.g., about 10 grams per magnet) and small coils of wires (e.g., small flat coils) to induce the magnetic forces.

It is to be noted that the coils, as discussed in detail below with respect to FIG. 1C, can be small enough to be configured into spiral art work in, for example, a 2 or 4 layer circuit board (e.g., 240 as shown in FIG. 1A) to eliminate the cost and space of separate coils that require manufacturing and then mounting. It is to be appreciated that while a spiral coil is less efficient than a wound coil, the forces are substantially small and the total power is still less than a watt per coil so heat is not a problem.

It is to also be noted that if configured as spiral coils, such coils do not need to have the coupled magnets, e.g., 5b and 5d shown in FIG. 1A, to be inserted into a formed hole in the middle of the spiral coil (which might be done to increase magnetic force). Instead, the magnets (e.g., 5b and 5d) can be placed a distance of, for example, about 2 millimeters away from the circuit board (not shown) to enable a beneficial +/−1 millimeter movement of the mirror 9 and coupled magnets e.g., 5b and 5d, as generally provided by the configuration shown in FIG. 1A.

FIG. 2 illustrates an example beneficial embodiment of the present invention, generally designated by the reference numeral 200, wherein the optical layout is in the form of a compact yet rugged FTIR spectrometer system utilizing a Michelson interferometer design that includes a hybrid movement system (now denoted by 100'), i.e., a linear slide or ball bearing system in combination with the moving Flexure Mounted Moving Mirror configuration 100, as discussed above.

It is to be appreciated that while the system shown in FIG. 2, in addition to other embodiments to be discussed hereinafter, are illustrated in schematic form and comprise Michelson interferometer types of geometries, it is to be understood that such interferometer systems can be laid out in many other beneficial configurations, as known to those in the art, and that the general illustration of FIG. 2 as well as other embodiments shown herein is merely intended to be exemplary of such various configurations without limiting it to only that depicted.

It is to be noted that the interferometer 200, and specific components, as shown in FIG. 2, as well as other embodiments disclosed herein, are capable of being operated via a computer or processor 30, which may be a dedicated digital computer or digital signal processor, as known to those of ordinary skill in the art. The coupling 32 between the instrument 200 and the computer 30 is by way of any I/O means for carrying out operations. Often the coupling 32 includes a USB port although the application software can interface with the instrument 200 by any known coupling means as understood by those of ordinary skill in the art. Such coupling means provides programmatic control instruction and operational data (feedback) via the embedded software of the present invention in addition to any other necessary electronic manipulation. The computer 30 is also often electronically coupled to one or more other output devices, such as display screens, printers, etc. and/or one or more other input devices, such as keyboards, internet connections, etc.

It is known to those of ordinary skill in the art that a computer or processor 30, as shown in FIG. 2, can orchestrate the control one or more moving parts of a scanning interferometer system, such as, the moving mirror assembly 100 portion of the, as well as any other translating optical elements (e.g., reflectors) as utilized in conventional instruments. Such a control means enables the components capable of movement to start, change direction, change tilt orientation, and move with a desired velocity. In effect, such a computer/processor 30 can determine and thus provide the gain and signals in real time so that a configured circuit can apply necessary drive currents to induce desired movement forces.

Instructions to start predetermined measurements, the analysis of data, etc., are also often primarily executed by the computer 30 shown in FIG. 2. However, operations can also be executed under instructions stored on a machine-readable medium (e.g., a computer-readable medium). A computer-readable medium, in accordance with aspects of the present invention, refers to mediums known and understood by those of ordinary skill in the art, which have encoded information provided in a form that can be read (i.e., scanned/sensed) by a machine/computer and interpreted by the machine's/computer's hardware and/or software.

In particular, the computer-readable media can often include local or remote memory storage devices, such as, but not limited to, a local hard disk drive, a floppy disk, a CD-ROM or DVD, RAM, ROM, a USB memory device, and even any remote memory storage device known and understood by those skilled in the art. The invention may also be practiced in distributed computing environments, wherein associated tasks are performed by remote processing devices that are linked through a communications network (e.g., wireless).

Turning back to FIG. 2, the interferometer 200 provides a beam (denoted by the letter A and small dashed line marking) that leads to directed collimated infrared light (denoted as A' as also shown by the small dashed line marking), as enabled by the off-axis reflector 8 in combination with a heated infrared source 7 chosen from any customized or conventional known source utilized in the field. Examples of such sources include, but are not limited to, a wire, metal or ceramic element that is heated to emit a continuous band of optical radiation. By way of example operation of the interferometer 200, modulated infrared light 11 exits (as denoted by the large directional arrow) to be utilized so as to interrogate a given sample (not shown).

The interferometer 200 of FIG. 2, being constructed as a Michelson-type of interferometer comprises a fixed mirror (e.g., mirror 10) and now a novel hybrid moving mirror assembly 100', as shown in detail in FIG. 2. The translational position and correlated velocity of the moving mirror 9, in addition to tilt, can thus, as one arrangement, be detected by incorporating a monochromatic emission source 19 (e.g., laser) which provides an output beam (as denoted by the letter B and larger dashed markings) configured to determine not only the position and velocity of the moving mirror 9 but also any other moving optical component in the system if desired. In operation, beam B is directed through a configured beamsplitter 21 and thereafter further directed to the front face of a beamsplitter 1 by a mirror 12. Upon being received by the front face of beamsplitter 1, a reflected portion (denoted as B') off of beamsplitter 1 is thereafter received by fixed mirror 10 arranged to retro-reflect beam B' (also shown with by bi-directional arrows) back towards beamsplitter 1/compensator plate 2. A portion of beam B is also transmitted through beamsplitter 1/compensator plate 2, as denoted by B", and directed to a novel moving mirror 9 arrangement of the present invention, wherein it is also retro-reflected back (as also shown by bi-directional arrows) to beamsplitter 1/compensator plate 2.

The recombination of the portion of the beam B" that passes through beamsplitter 1/compensator plate 2 and thereafter reflected by mirror 9 with the portion of the beam B' directed to and reflected off of fixed mirror 10, provides an output beam (denoted as B''') now having an interference pattern that contains desired optical position and velocity information with respect to moving mirror 9. Thus, monitoring beam B''' enables the speed and position and tilt of a desired face of moving mirror 9 to be precisely determined by counting the peaks and valleys in the amplitude of the beam B''' as directed by reflector 13 (also shown with a directional arrow) to an interrogating detector 14 (often a quad detector).

Figure 3:
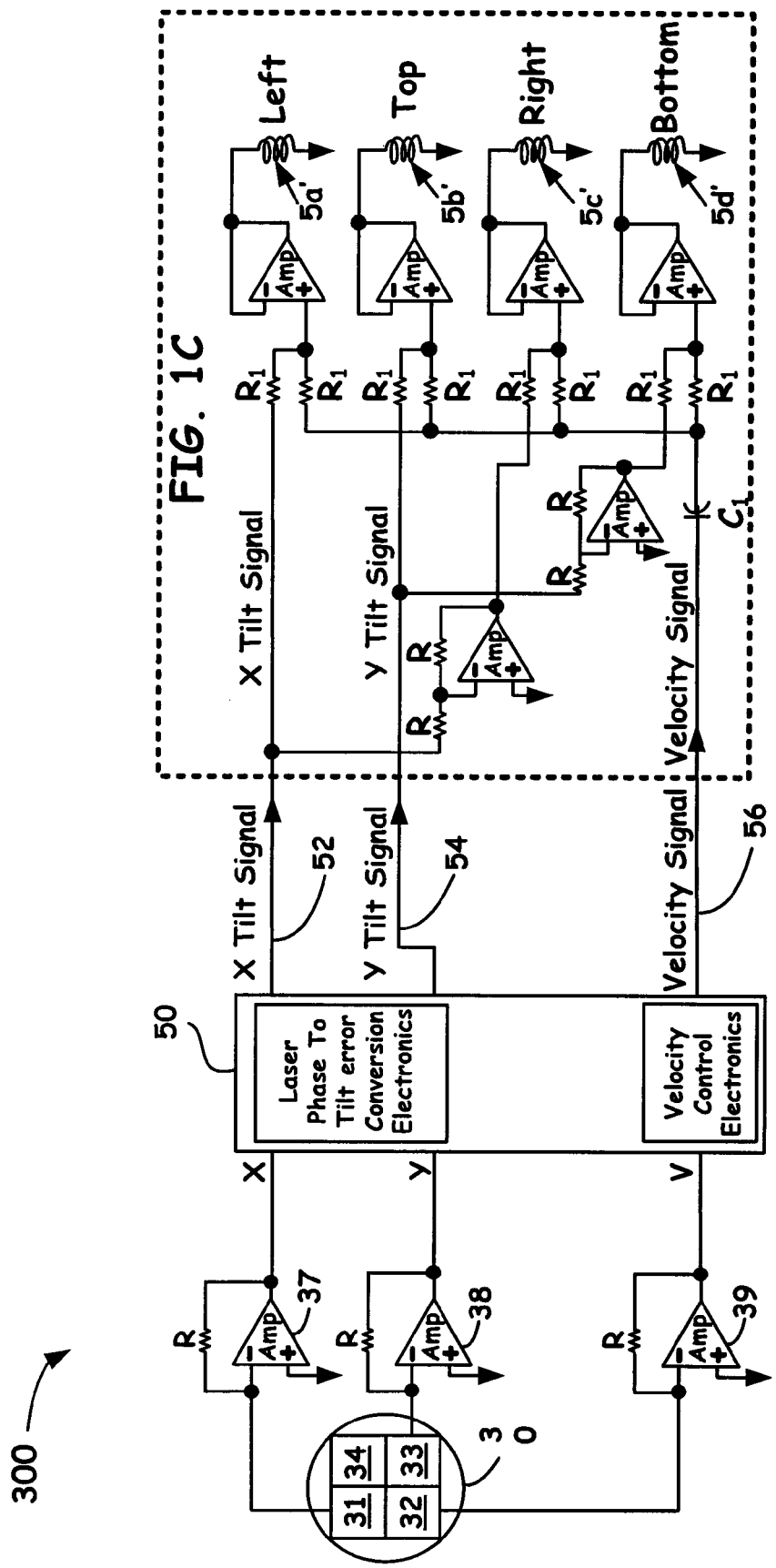
FIG. 3 shows a phase differential circuit coupled to the circuit of FIG. 1C, which in combination is configured to measure and control velocity and tilt of the Hybrid Flexure Mounted Moving Mirror of the present invention.

As one example embodiment, when configured as a quad detector 14, one of the quadrants can be configured to provide a sine wave signal, which is representative of the of the position and velocity of moving mirror 9, the signal of which is coupled to velocity control measuring electronics (as shown in FIG. 3) for processing. To provide tilt information, the quadrants in combination (to be discussed below with respect to FIG. 3) can be spaced apart so that the deviation of a perpendicular of any moving part of the system to a given longitudinal axis can be determined by differences in the phases of the interference fringes as detected by the different quadrants.

Such tilt and velocity control measuring electronics (discussed below) in cooperation with an example controller 30, as shown in FIG. 2, provides for one or more signals 52, 54, and 56 (e.g., the velocity control signal), shown in FIG. 1C in an orchestrated manner to move mirror 9 with a desired tilt and with a desired velocity and/or to a desired position. For example, as stated above, a resultant velocity control signal 56, as shown in FIG. 1C, can be applied substantially equal to all configured coils, e.g., coils $5a'$, $5b'$, $5c'$, and $5d'$ for a desired movement and/or velocity with a +Y signal being applied to the top coil $5b'$ and a −Y signal being applied to the bottom coil $5d'$ and with a +X signal being applied to the left coil $5a'$ and a −X signal being applied to the right coil $5c'$.

An alternative example design is to use the returning laser light beam that is directed back to the monochromatic light source 19. Such a beam has the same optical velocity and position information as the exiting beam B''' with the benefit that it does not translate sideways even if other configured components within the system, such as, but not limited to, beamsplitter 1, are in movement based on their design. Such alternative moving components are described in the aforementioned incorporated by reference U.S. patent application Ser. No. 12/944,512 entitled: "INTERFEROMETER VELOCITY CONTROL OF BEAMSPLITTER AND MOVING MIRRORS," filed Nov. 11, 2010, and incorporated by reference U.S. patent application Ser. No. 12/944,428, entitled: "DUAL INPUT INTERFEROMETER BEAMSPLITTER TILT CONTROL SYSTEM AND FLEXURE MOUNTING," also filed on Nov. 11, 2010. Thus, the returning beam can be received upstream by beamsplitter 21 designed to direct a portion (denoted as B''' in FIG. 2) of the received beam to a second detector 20 (e.g., another quad detector) often but not necessarily mounted near monochromatic source 19.

As noted herein, all low cost linear bearing systems have some tilt error and add velocity error noise. The example interferometer 200, as shown in FIG. 2, uses such a small low cost bearing 242 (e.g., a ball slide or slider type of linear bearing) to provide as much stroke length as is needed. In operation, this linear bearing supports the entire moving mirror assembly 100' including the resilient moving mirror mount 100 (as shown in FIG. 1A) and the magnets and coils that are used to control the small movements of the moving mirror flexure arrangement. The small movements of the moving mirror allowed by the moving mirror resilient member 6, as discussed above, can thus easily correct the position errors caused by the long stroke linear bearing 242 that supports the moving mirror assembly 100'.

With respect to the assembly, as shown in FIG. 2, the entire moving mirror assembly 100', including the moving mirror 9, its supporting flexure 6, the magnets (e.g., 5b and 5d) and coils (e.g., 5b' and 5d') that control the position of the mirror 9 and the long stroke linear bearing (as shown as part of beam 290) that supports above assembly 100', is position and velocity controlled by an additional larger magnet 260 mounted on the coupling block 295 that connects long travel linear bearing 290 to the moving mirror assembly 100' near the center of mass of the entire linear bearing 290 and moving mirror assembly 100'. The forces needed to move this larger magnet are provided by a larger coil 250 that is mounted on the non moving base of the interferometer 241

The larger drive coil 250 and magnet 260 controls the position of the long travel rolling or sliding bearing 290 that is supported by the linear bearing block mounted on interferometer base 241, and is designed to be larger to provide control over the entire length (from up to about 10 mm all the way up to about to 100 mm or greater) of the long stroke bearing and this magnet 260 and coil 250 needs to provide enough force to control the velocity of the total weight of the entire moving mirror assembly 100' including the weight of the large drive magnet 260 itself. As stated previously, the small magnets, e.g., 5b and 5d (often 4), as shown in FIG. 1A, that control the position of the moving mirror 9 itself are much smaller as their forces adds beneficially, the weight of the mirror is less than that of the moving mirror assembly, and the total travel needed is less than about +/−1 mm relative to the moving mirror coils 5b' and 5d' that are mounted on the circuit board 240 configured with the moving mirror assembly 100'.

The velocity control signal 56, (not shown), can be applied to the large drive coil 250 to move the entire moving mirror assembly 100' as needed so as to create a desired interferogram data. At the same time, a part of the same velocity control signal 56, as shown in FIG. 1C, can also be applied to all 4 of the small magnets (5a, 5b, 5c, and 5d, as shown in FIG. 1B) via cable 280, to provide a desired force to accelerate the moving mirror 9 in the same direction. If the forces on the small magnets (5a, 5b, 5c, and 5d) are properly sized, the moving mirror 9 and the supporting moving mirror assembly 100' accelerate together, limiting the flexure travel to substantially nothing. The resilient member 6 beneficially isolates the high frequency vibrations (i.e., frequencies in the range of 50 Hz up to about 5000 Hz) that can cause spectral problems.

If the force on the small magnets (5a, 5b, 5c, and 5d) is not limited but increased to what is easily achievable by systems known in the art and as utilized herein, the moving mirror 9 can accelerate faster than the moving mirror assembly 100', which is exemplary for eliminating velocity error. The resilient member 6 supporting the moving mirror 9 can then move further and a retarding force can be generated by the resultant deflected flexure of member 6. The velocity control servo (as shown in FIG. 3) can then increase the drive voltage as needed to overcome the retarding force, this same increase in drive voltage can be applied to the large drive coil 250 and the resulting force can speed up the heavier moving mirror assembly 100' until it "catches up to" the moving mirror 9 reducing the deflection of the resilient member 6 back toward the starting point so that the average flexure movement of member 6 is near zero. The retarding force of the resilient member 6 keeps the position of the moving mirror 9 and the moving mirror assembly 100' in proper relative position with no added control software or hardware.

By allowing the moving mirror 9 to travel faster than the heavier moving mirror assembly 100', the scan speed of the interferometer can be speeded up and or the size of the large drive magnet 260 and coil 250 can be reduced increasing performance and or reducing cost. The moving mirror 9, resilient member 6 and magnet drive system discussed above for FIG. 1A can be used to correct the tilt of a low cost linear bearing. By adding X and Y axis tilt measuring optics and electronics, as discussed below, and summing in the X and Y control signals through a simple resistor matrix, e.g., FIG. 1C, that combine the velocity and tilt signals that are sent to the 4 coil drivers for the low power small coils, control of the moving mirror 9 position and tilt is provided.

Accordingly, by correcting the linear bearing tilt errors by tilting the moving mirror 9, the alignment of the light beams with respect to the non moving parts of the instrument is better maintained than it is with the commonly used method of making small corrections in the fixed mirror to follow the errors in the moving mirror. It is to be appreciated that mounting the moving mirror 9 on a flexure (i.e., resilient member 6) allows the inertia of the moving mirror 9 to resist small vibration forces that can get through the soft flexure for time periods long enough for a utilized velocity and tilt measuring system to measure and integrate the error and to accurately correct the error before it becomes large enough to cause spectral error. The forces that do get through resilient member 6 are small enough that the inertia of the moving mirror 9 gives the error correction system about 500 microseconds to measure and make the needed corrections in both tilt and velocity which is enough time for the error measurements to be made (about 100 microseconds), the errors to integrate and be amplified (about 400 microseconds), and for the correcting current to build up in the coils (about 10 microseconds) and stop the erroneous movement of the mirror.

A configured control servo (e.g., as discussed below for FIG. 3) substantially corrects vibration (i.e., reduces errors by a factor of about 50) that are less than about 20 Hz. At 100 Hz, the correcting servo can only reduce errors by a about a factor 10. For vibration errors in the frequency range of 500 Hz the control servo can only reduce errors by about a factor of 2. At higher frequencies only the inertia of the interferometer parts is really effective. The flexure mounted moving mirror 9 allows inertia to be effective down to about 20 Hz and therefore the overall system of the present invention is beneficial in rejecting vibration at any frequency from about 1 Hz where the servo control system works great and inertia is ineffective to greater than about 10,000 Hz because inertia beneficially comes into operation at high frequencies where the servo is ineffective.

FIG. 3 shows a beneficial example velocity and phase tilt circuit, generally designated by the reference character 300, which incorporates a quad detector 30 (e.g., one of either of example detectors 14, 20 of FIG. 2) to collect the modulated light at any of the arranged example locations shown in FIG. 2. The circuit of FIG. 3 thus shows a detector having detection quadrants 31, 32, 33, 34, which are arranged to direct signals to subsequent circuitry 37, 38, 39, and 50 to provide the velocity control 56 as well as the X (52), Y (54) tilt signals that can be utilized by complimentary servo circuits.

As an example operation, the signal from quadrant 32 can be used to provide a sine wave signal (denoted as V) to the velocity control electronics so as to initiate a velocity signal 56 to be received by a velocity servo circuit, such as the pertinent portion of the circuit shown in FIG. 1C. The signal from quadrant 32 is also capable of being used to provide a common reference signal to compare the phase of the signals resultant from predetermined quadrants of detector 30. Thus, the circuitry of FIG. 3 can use the phase difference in the optical signals of quadrants 31 and 32 to measure, for example, tilt in the X axis and quadrants 33 and 32 to measure the Y axis tilt. Quadrant 34 in this example is not used.

For example, the light phases detected by quadrants 33 and 32 can be manipulated to drive the coupled subsequent circuitry of FIG. 1C that includes configured coils 5b' and 5d' (as also now shown in the dashed box within FIG. 3B for ease of reading). Correspondingly, induced magnetic forces are provided by coils 5b' and 5d' that interact with magnets 5b and 5d respectively, as shown in FIG. 1B, so as to move the mirror 9 of the present invention up and down, i.e., to provide the Y axis tilt.

In addition, the light phases interrogated by quadrants 31 and 32 can be manipulated to also drive relevant portions of the coupled subsequent circuitry of FIG. 1C (shown within the dashed box) that includes configured coils 5a' and 5c'. Also correspondingly, induced magnetic forces are provided by such coils that interact with magnets 5a and 5c respectively, as shown in FIG. 1B, to move the mirror 9 of the present invention from side to side, i.e., to provide the X axis tilt.

Thus, the forces generated by the configured coils (e.g., 5a', 5b', 5c', and 5d', as shown in example circuit FIG. 1C as coupled to the circuit 300 in FIG. 3) and magnets (e.g., 5a, 5b, 5c, and 5d, as shown in FIG. 1B) via signals provided by circuit 300 in FIG. 3B, enable tilt of the moving mirror 9 in the X and Y axis to align the flat surfaces in the interferometer.

A conventional velocity control servo can thus be configured to control the moving mirror 9 using the natural centering force of the resilient flexure 6 discussed above to allow the moving 9 flexure 6 configuration to make small controlled strokes while the linear bearing 242 makes the long controlled strokes. In this arrangement, the control system of the present invention has the fast response time of the moving mirror 9 and the long stroke of a linear bearing moving 242, the result of which improves the overall active velocity control design depicted herein to enable a system that is similar to, but an improvement of, conventional long stroke systems that provides high resolution.

As another beneficial arrangement, the velocity control servo signal 56 can be sent through a high pass filter (i.e., a capacitor) before it is used to drive the moving mirror 9 while simultaneously providing the velocity control servo signal 56 to move assembly 100'. Such a configuration enables the mirror assembly 100 of FIG. 1A to rapidly change velocity to improve velocity control and at the same time limit the moving mirror 6 stroke length.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

The invention claimed is:

1. A dynamic hybrid moving mirror interferometer, comprising:
    a beam splitter for receiving a beam of radiation from a source so as to provide a first and a second portioned beam;
    a first reflector configured to receive and return said first portioned beam of said source along a first optical path length;
    a resilient member directly coupled about the periphery of a second reflector and coupled to a support structure, wherein said resiliently mounted second reflector is configured to receive and return said second portioned beam of said source along a second optical path length;
    a plurality of first motors coupled to a predetermined surface of said second reflector and configured to drive short stroke linear movement and, optionally, tilting movements about configured X and Y axes of said resiliently mounted reflector;
    a second motor coupled to said support structure and configured to drive long stroke linear movement of said resiliently mounted reflector; and
    a control system configured to provide a feedback controlled velocity control signal, said velocity control signal applied to both said plurality of first motors and to said second motor to provide short stroke velocity and position control of said resiliently mounted reflector via said velocity control signal and, optionally, tilt control about said configured X and Y axes, in addition to long stroke velocity and position control of said resiliently mounted reflector via said velocity control signal, so as to provide an interrogating interferogram of the input source beam radiation at a configured exit of said interferometer.

2. The dynamic hybrid moving mirror interferometer of claim 1, wherein said resilient member is designed to provide for about +/−1 millimeter of linear displacement and is further configured to provide a retarding force resultant from said about +/−1 millimeter of linear displacement.

3. The dynamic hybrid moving mirror interferometer of claim 2, wherein said resilient member provides isolation of high frequency vibrations in the range of about 50 up to about 5000 HZ.

4. The dynamic hybrid moving mirror interferometer of claim 2, wherein said resilient member comprises at least one material selected from: fabric, polymers, plastics, Mylar, metals, and paper.

5. The dynamic hybrid moving mirror interferometer of claim 1, wherein said plurality of first motors comprises a plurality of permanent magnets coupled to said predetermined surface of said second reflector, wherein applied feedback controlled magnetic fields selectively attract or repel one or more of said coupled permanent magnets in order to provide linear and, optionally, tilt movements of said resiliently mounted reflector.

6. The dynamic hybrid moving mirror interferometer of claim 5, wherein said control system is configured to enable said applied feedback controlled magnetic fields to provide for desired tilts in an X and/or Y Axis of said resiliently mounted reflector in the range of up to about 10,000 arc seconds.

7. The dynamic hybrid moving mirror interferometer of claim 1, wherein said velocity control signal is applied to said second motor to move an entire assembly that includes said resiliently mounted reflector and said support structure in a desired direction and wherein said velocity control signal is also applied to said plurality of first motors to provide one or more predetermined forces to accelerate said resiliently mounted reflector in the same said desired direction so as to accelerate together and minimize the flexed movement of said resiliently mounted reflector.

8. The dynamic hybrid moving mirror interferometer of claim 7, wherein said resiliently mounted reflector accelerates faster with respect to the remainder of said entire assembly.

9. The dynamic hybrid moving mirror interferometer of claim 7, wherein said velocity control signal is sent through a high pass filter prior to being applied to said plurality of first motors.

10. The dynamic hybrid moving mirror interferometer of claim 1, wherein vibrations are isolated in the system of said interferometer in the frequency range from about 1 Hz to greater than about 10,000 Hz.

* * * * *